United States Patent
Huang

(10) Patent No.: US 6,691,991 B1
(45) Date of Patent: Feb. 17, 2004

(54) SHOCK ABSORBER

(76) Inventor: Tan-Cheng Huang, 6FL., No. 2-1, Swei St., Taichung (TW)

( * ) Notice: Subject to any disclaimer, the term of this patent is extended or adjusted under 35 U.S.C. 154(b) by 0 days.

(21) Appl. No.: 10/391,237

(22) Filed: Mar. 18, 2003

(51) Int. Cl.$^7$ .................................................. B60G 1/00
(52) U.S. Cl. ..................................... 267/291; 267/286
(58) Field of Search ..................... 188/129, 134–137; 267/33, 134–137, 201, 202, 203, 221, 286–291

(56) References Cited

U.S. PATENT DOCUMENTS

| | | | | |
|---|---|---|---|---|
| 2,705,634 A | * | 4/1955 | Sampson et al. | 267/221 |
| 4,126,302 A | * | 11/1978 | Curnutt | 267/136 |
| 5,711,514 A | * | 1/1998 | Lu | 267/221 |
| 5,803,443 A | * | 9/1998 | Chang | 267/221 |
| 5,820,114 A | * | 10/1998 | Tsai | 267/202 |

* cited by examiner

*Primary Examiner*—Christopher P. Schwartz
(74) *Attorney, Agent, or Firm*—Charles E. Baxley

(57) ABSTRACT

A shock absorber comprising: a cylinder body has a piston rod movably received therein, a shock absorbing spring is mounted to the cylinder body and biased between the piston rod and the cylinder body, a buffering spring is mounted to an end of the piston rod in the cylinder body and biased between the inner edge of the cylinder body and the end of the piston rod.

4 Claims, 4 Drawing Sheets

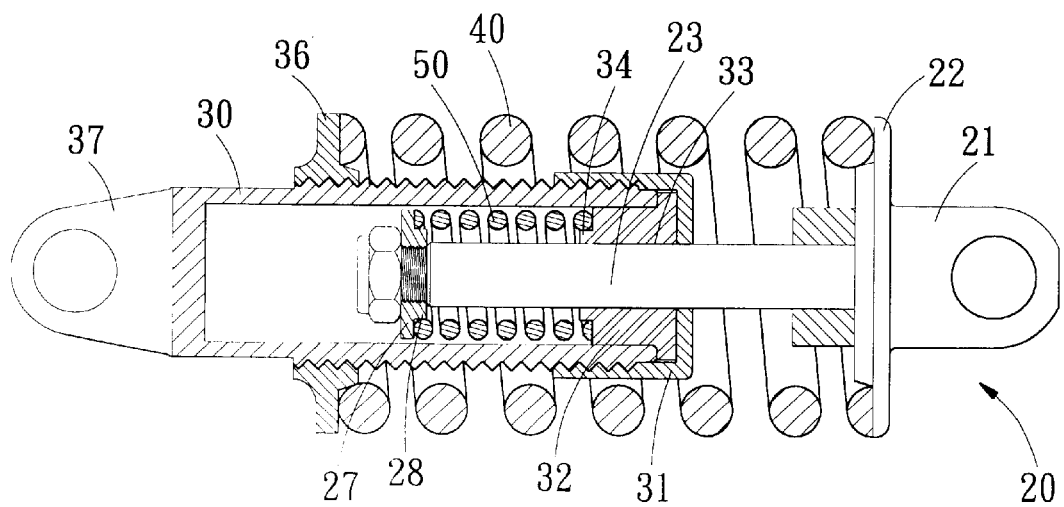
F I G. 3

SHOCK ABSORBER

BACKGROUND OF THE INVENTION

1. Field of the Invention

The present invention relates to a shock absorber, and more particularly to a shock absorber having a shock absorbing spring and a buffering spring, which is able to provide a perfect shock absorbing effect.

2. Description of the Prior Arts

Referring to FIG. 1, a conventional shock absorber for a bicycle (including scooter, motorcycle and the like) is shown to comprise a cylinder body 10, a piston rod 11 extending into the cylinder body 10, and a spring 13 associated operably with the cylinder body 10 and the piston rod 11. The piston rod 11 includes a flange 111 and a cushion 112 defined at an end, the cylinder body 10 includes an adjustable stopping member 101 defined at a corresponding end, the piston rod 11 is movably positioned there by virtue of a limiter 12. Furthermore, a spring 13 is biased between the flange 111 of the piston rod 11 and the stopping member 101 of the cylinder body 10, such that the spring 13 is able to absorb the relative stress between the piston rod 11 and the cylinder body 10, and a deformation effect of the spring 13 is eliminated by the relative displacement between the piston rod 11 and the cylinder body 10. The conventional shock absorber described above has been commonly used, however, it has some disadvantages in operation as follows:

First, the spring 13 of the conventional shock absorber is normally in high elasticity coefficient in order to achieve an effective cushioning effect (the shock absorbing system is too stiff), however, the high elasticity coefficient spring is difficult to be deformed and compressed in case that the piston rod 11 and the cylinder body 10 relatively move under a pressure, moreover, it even won't be deformed in case of a minor pressure (no cushioning effect), resulting in a disadvantage of the shock absorbing effect.

Second, in order to keep the shock absorbing effect continuous operation, the manufacturers usually employ shock absorbing spring with high elasticity coefficient, however, the restoring force and recovering speed of the spring 13 are great, which will lead to self-percussion when the spring 13 reaches the elasticity ultimate (return to the initial position), also cause collisions between the spring 13 and the piston rod 11, cylinder body 10 accompanied by noise.

Third, it should be pointed that the manufacturers usually don't have the shock absorber equipped with a buffering device in order to save cost, the collisions during the restoring course of the spring will not be buffered, thereby, it not only impairs the shock absorbing effect but also results in an uncomfortable riding.

Targeting at solving the above disadvantages, an effective hydraulic buffer was invented, however, the line piping, leak-proof element and liquid oil are very expensive, furthermore, the line piping should be thickened and no gas hole allowed (material cost is high), a plurality of sealing members should be employed, all these factors increased the production cost of the hydraulic buffer.

The present invention has arisen to mitigate and/or obviate the afore-described disadvantages of the conventional shock absorber.

SUMMARY OF THE INVENTION

In accordance with one aspect of the present invention, there is provided a shock absorber comprising: a piston rod movably received in a cylinder body, a shock absorbing spring is mounted to the cylinder body and biased therebetween, a buffering spring is mounted to an end of the piston rod in the cylinder body and biased between the inner edge of the cylinder body and the end of the piston rod.

The primary objective of the present invention is to provide a shock absorber having an ability of easing off the longitudinal expansion movement and compression movement of the shock absorbing spring so as to provide a smooth cushioning effect.

Another objective of the present invention is to provide a low cost shock absorber having a smooth cushioning effect by taking advantage of the relative motion of the two low cost springs.

A further objective of the present invention is to provide a shock absorber with comfortable cushioning effect, in which, the buffering spring eases off the longitudinal expansion movement and compression movement of the shock absorbing spring, preventing overly longitudinal expansion and self-percussion during the restoring course of the absorb shocking spring.

A further objective of the present invention is to provide a shock absorber, which is sensible to a slight shock by virtue of the restoring power of the buffering spring effectively reducing the compressing elasticity coefficient of the shock absorbing spring.

The present invention will become more obvious from the following description when taken in connection with the accompanying drawings, which shows, for purpose of illustrations only, the preferred embodiment in accordance with the present invention.

BRIEF DESCRIPTION OF THE DRAWINGS

FIG. 3 is a cross sectional view of showing in a state of equilibrium of a shock absorber according to the present invention;

DETAILED DESCRIPTION OF THE PREFERRED EMBODIMENT

Figure 1:
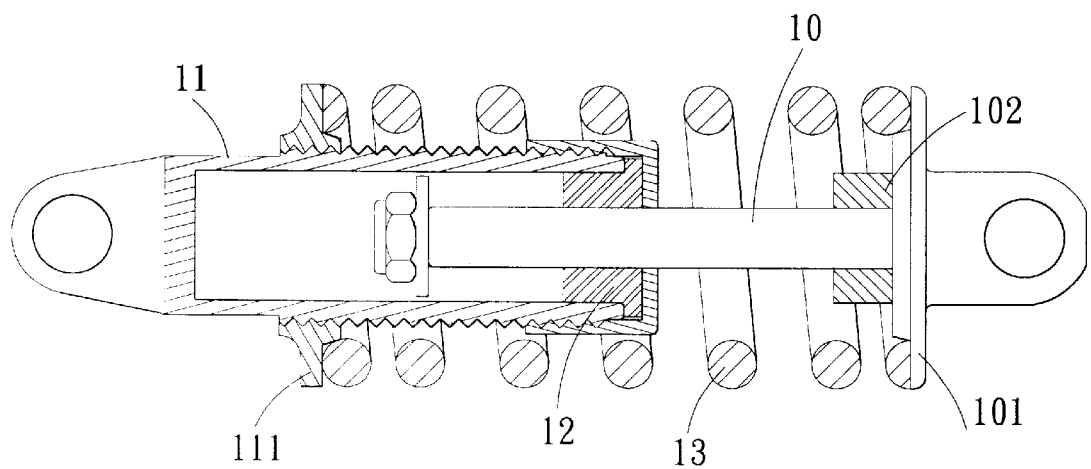
FIG. 1 is a cross sectional view of a conventional shock absorber.
Figure 2:
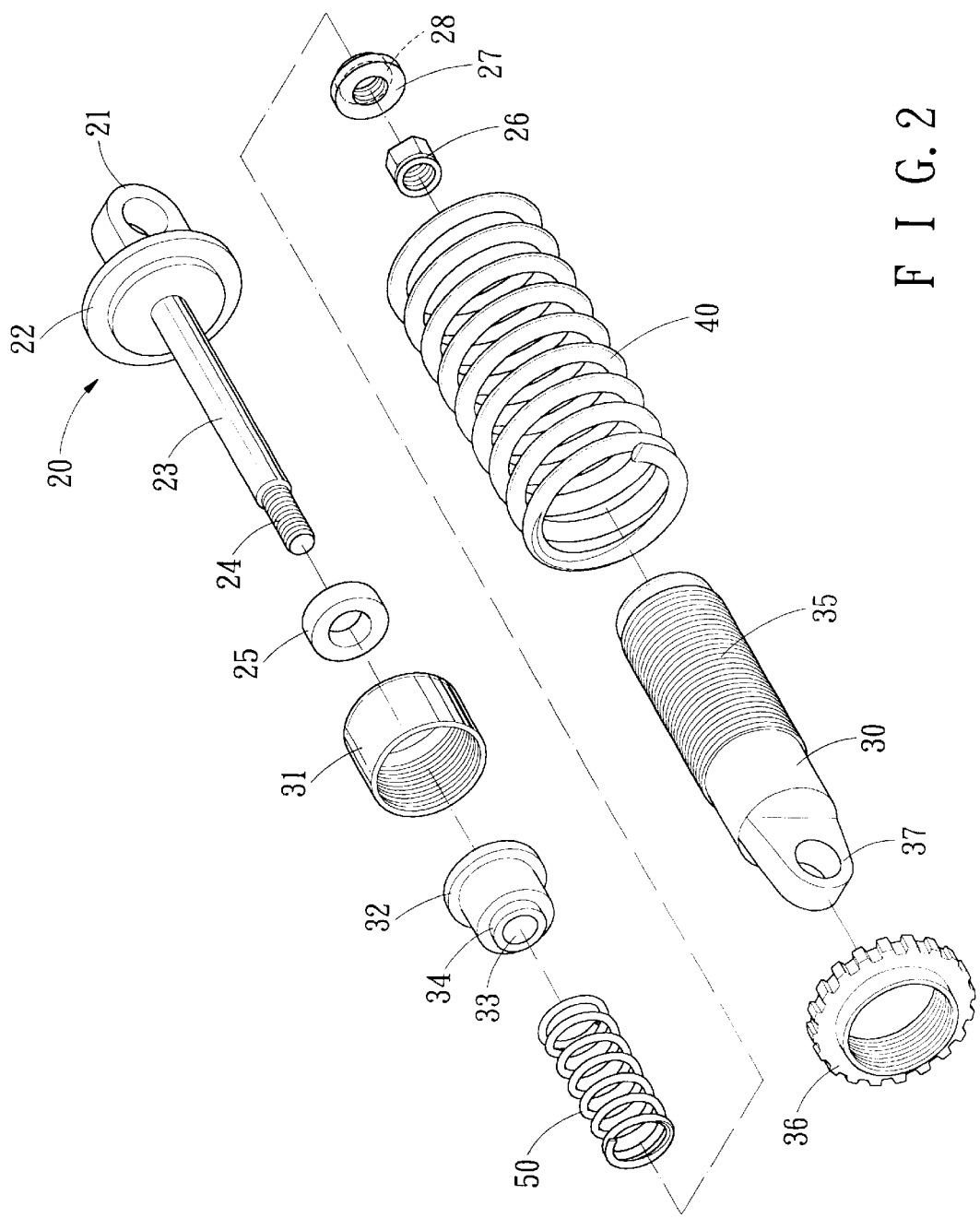
FIG. 2 is an exploded view of a shock absorber according to the resent invention.

Referring to FIGS. 2–3, in which, a shock absorber of the present invention consists of a piston rod 20, a cylinder body 30, a shock-absorbing spring 40 and a buffering spring 50.

A coupling portion 21 and a flange 22 are formed in turn at a first end of a rod portion 23 of the piston rod 20 respectively. A second end of the rod portion 23 is formed with a threaded portion 24. The piston rod 20 includes a cushion 25 mounted to the rod portion 23. A nut 26 and a washer 27 are engaged with the threaded portion 24 of the rod portion 23, the washer 27 has a flange portion 28 formed thereof.

The cylinder body 30 is a hollow pipe formed with threads 35 on the outer surface, including a cover 31 threadedly engaged with a first end thereof, the cover 31 is interiorly set with a limiting member 32, the limiting member 32 has a passage 33 interiorly formed therethrough which is corresponding to the rod portion 23 of the piston rod 20, the passage 33 employed to ensure the rod portion 23 of the piston rod 20 sliding steadily in the cylinder body 30, moreover, limiting the washer 27 of the piston rod 20 to slide in the cylinder body 30 without sliding out. A flange 34 is formed on the limiting member 32 where corresponding to the bottom edge of the inner cylinder body 30, the flange 34 is formed about the periphery of the passage 33. The cylinder body 30 has a coupling portion 37 formed at an end corresponding to the cover 31. Furthermore, a stopping member 36 is screwed with threads 35 of the cylinder body 30 corresponding to the coupling portion 37.

The shock absorbing spring 40, having a predetermined elasticity coefficient, is movably mounted to the cylinder body 30 with a first end abutting against the flange 22 of the piston rod 20 and a second end abutting against the stopping member 36 of the cylinder body 30.

The buffering spring 50, having a predetermined elasticity coefficient relatively minor than that of the shock absorbing spring 40, is movably mounted to the rod portion 23 of the piston rod 20 with a first end abutting against the limiting member 32 of the cylinder body 30 and a second end abutting against the flange portion 28 of the washer 27 of the piston rod 20, the inner edge of the first end of the buffering spring 50 is mounted to the flange 34 by annularly abutting against the periphery thereof while the inner edge of the second end of the same abuts against the periphery of the rod portion 23 and positioned there.

Figure 4:
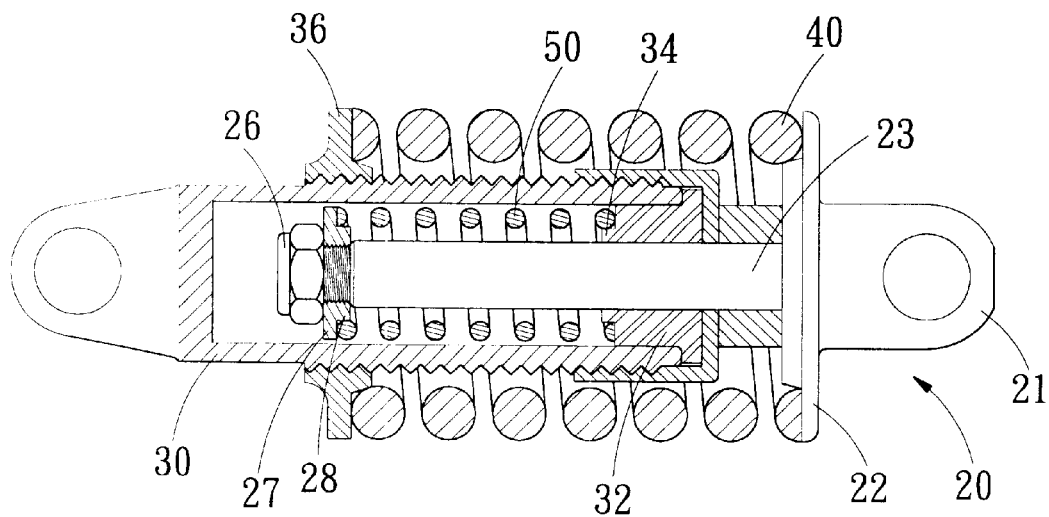
FIG. 4 is another cross sectional view of showing a shock absorber according to the present invention.

Referring now to FIGS. 3–4, wherein, in an unloaded condition or in case of no pressure (as shown in FIG. 3), the shock absorbing spring 40 will outwardly push the flange 22 of the piston rod 20 and the stopping member 36 of the cylinder body 30 so that the piston rod 20 and the cylinder body 30 are forced to extend outward, the expanding force of the shock absorbing spring 40 enables the buffering spring 50 to be compressed longitudinally and store a restoring force, thereby, at this moment, the buffering spring 50 has a greatest restoring force while the shock-absorbing spring 40 in a status of most easy to be compressed (in an ever relaxed status).

Referring to FIG. 4, wherein, in case of a shock or under pressure, the shock absorbing spring 40 is compressed to force the piston rod 20 and the cylinder body 30 to draw back, although the shock is not great enough to cause a complete compression of the shock absorbing spring 40, due to the restoring force of the buffering spring 50 is simultaneously released, the buffering spring 50 will cooperate with shocking power to compress the shock absorbing spring 40, as a result, the shock absorber of the present invention will have a smooth reaction at the beginning of a shock (kind of comfortable). In an initial course of a shock, the buffering spring 50 will help to compress the shock absorbing spring 40 with its greatest restoring force, after the compression of the shock absorbing spring 40, the restoring force of it is relatively strengthened while that of the buffering spring 50 is reduced, thereby the shock-absorber of the present invention is able to provide a comfortable shock absorbing effect and which is up to an ergonomical requirements.

When the shock absorber of the present invention starts to recover, due to the restoring force of the shock absorbing spring 40 is ever greatest while that of the buffering spring 50 is relatively weak, the shock absorbing spring 40 will expand rapidly and lead to a simultaneous extending movement of the piston rod 20 and cylinder body 30. With the extending movement of the shock absorbing spring 40, which causes a longitudinal compression of the buffering spring 50 to store energy. The extending movement of the shock absorbing spring 40, shortly before it coming to end, will lead to an inward compression movement of the buffering spring 50. At this moment, the buffering spring 50 start to gain and gradually store a restoring force which is adverse to that of the shock absorbing spring 40, thereby, the buffering spring 50 will absorb an overly expanding force of the shock absorbing 40 (the compressing restoring force of the buffering spring 50 is adverse to that of the shock absorbing spring 40), such that prevent an over-rapid longitudinal expansion movement of the shock absorbing spring 40 and collisions on other parts (reaching the end), furthermore, buffering the strikes generated from an over-rapid longitudinal expansion movement at the end of a longitudinal compression movement.

While we have shown and described various embodiment in accordance with the present invention, it should be clear to those skilled in the art that further embodiments may be made without departing from the scope of the present invention.

What is claimed is:

1. A shock absorber comprising: a piston rod, a cylinder body, a shock absorbing spring and a buffering spring;

said piston rod having a coupling portion and a flange formed in turn at a first end, and a washer at a second end;

said cylinder body being a hollow pipe formed with threads formed on an outer surface, including a cover threadly mounted to a first end thereof, the cover interiorly set with a limiting member, the limiting member having a passage corresponding to a rod portion of said piston rod interiorly formed therethrough for ensuring the rod portion of said piston rod sliding steadily in said cylinder body and limiting the washer of said piston rod to slide in said cylinder body without sliding out, said cylinder body having a coupling portion formed at a second end thereof corresponding to the cover and a stopping member screwed thereon corresponding to the coupling portion;

said shock absorbing spring having a predetermined elasticity coefficient and movably mounted to said cylinder body with a first end abutting against the flange of the piston rod and a second end abutting against the stopping member of said cylinder body;

said buffering spring having a predetermined elasticity coefficient relatively minor than that of said shock absorbing spring and movably mounted to the rod portion of said piston rod with a first end abutting against the limiting member of said cylinder body and a second end abutting against the washer of said piston rod.

2. The shock absorber as claimed in claim 1, wherein a flange is formed on the limiting member where corresponding to the bottom edge of the inner cylinder body, the flange is formed about a periphery of the passage, an inner edge of the first end of said buffering spring is mounted to the flange in a manner of annularly abutting against the periphery and an inner edge of the second end of the same abutting against the periphery of the rod portion.

3. The shock absorber as claimed in claim 1, wherein a cushion is mounted to an end of said piston rod.

4. The shock absorber as claimed in claim 1, wherein the second end of the rod portion of said piston rod is formed with a threaded portion, a nut and a washer are engaged with the threaded portion of the rod portion.

* * * * *